July 31, 1962 R. B. ALLURED ETAL 3,047,767
CIRCULAR TRACE SCOPE DISPLAY
Filed Aug. 31, 1959 2 Sheets-Sheet 1

INVENTORS
Robert B. Allured &
BY Merle Weiss
E. W. Christen
ATTORNEY

United States Patent Office 3,047,767
Patented July 31, 1962

1

3,047,767
CIRCULAR TRACE SCOPE DISPLAY
Robert B. Allured, Rochester, and Merle Weiss, Livonia, Mich., assignors to General Motors Corporation, Detroit, Mich., a corporation of Delaware
Filed Aug. 31, 1959, Ser. No. 837,157
7 Claims. (Cl. 315—24)

This invention relates to apparatus for modulating a circular trace on an oscilloscope and more particularly to a means for obtaining a circular trace that is visible for an arcuate length that is proportional to a variable signal.

It is sometimes desirable to provide a visible display of a signal representing some variable quantity such as angular displacement or torque. It is relatively simple to generate an electrical signal representative of this quantity, but present apparatus for displaying this signal are inadequate in that they are difficult to read, sluggish in response, or involve complicated and expensive electrical circuitry. The use of an electrical meter would be a simple means for displaying this information, but the inherent inertia of the meter movement and needle would adversely affect the accuracy of the reading. An oscilloscope display was found to provide the desired arcuate type reading, and such a display is instantaneous in response and involves no inertia. However, the present oscilloscope systems that provide a circular trace are not adapted to be easily read and proved to be difficult to construct from standard components.

It is therefore a principal object of this invention to provide a means for modulating the intensity of a circular trace on an oscilloscope such that a visible trace will result having an arcuate length that is proportional to a variable signal.

Another object of this invention is to provide an oscilloscope with deflection means to produce a circular trace and with intensity modulating means synchronized with the deflection means for producing a visible trace whose arcuate length is proportional to a variable signal.

A further object is to provide a means for indicating angular displacement on an oscilloscope having a circular sweep by modulating the intensity of the trace by a series of pulses that are synchronized with the sweep and having a pulse width that is proportional to the given angular displacement.

In accordance with the invention, the beam deflecting elements of a commercial oscilloscope are driven with a pair of alternating current (A.C.) potentials that are 90° out of phase so that a circular trace results on the oscilloscope screen. The A.C. potentials are obtained from an A.C. supply source by means of an appropriate phase shift circuit. The visible intensity of the trace on the oscilloscope screen is modulated by changing the voltage on an intensity modulating element or grid in the oscilloscope. This modulating voltage is in the form of a voltage pulse having a leading edge that is synchronized with the A.C. supply source and a pulse width that is proportional to the magnitude of a signal voltage. This voltage pulse is obtained from a mono-stable multivibrator or trigger output circuit whose input is taken from a thyratron having phase shift plus variable direct current (D.C.) bias. The plate supply voltage for the thyratron is obtained from the same A.C. supply as is used for the deflection circuit, and the variable D.C. bias is obtained from the desired signal voltage.

The novel features characteristic of this invention are set forth with particularity in the appended claims. The invention itself, however, both as to its organization and method of operation as well as additional objects and advantages thereof, will best be understood from the following description when read in connection with the accompanying drawing, in which:

2

Figure 1:
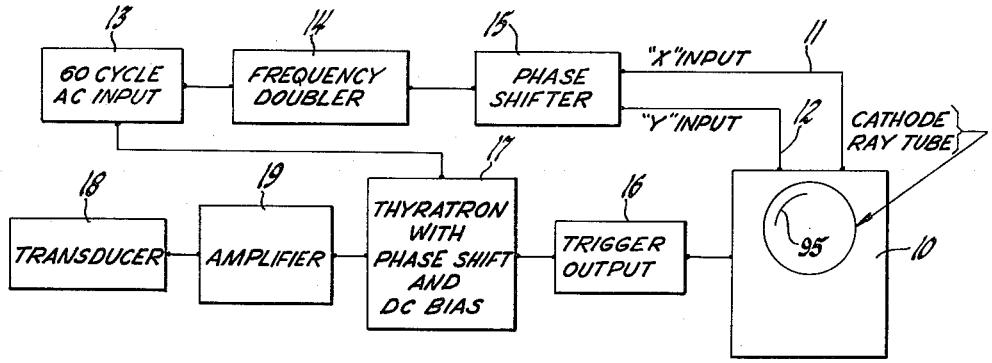
FIGURE 1 is a block diagram illustrating the principal components of the present invention.

Referring now to the drawings wherein like parts are indicated by like reference numerals in all figures, and referring particularly to FIGURE 1, an oscilloscope 10 is provided with an "x" or horizontal deflection input 11 and "y" or vertical deflection input 12. These inputs 11 and 12 are energized by two alternating voltages that are displaced in phase relative to one another by an angle of 90°. These signals are developed from an alternating voltage supply 13 which may be a standard commercial 60 cycle supply and which has its output connected to a frequency doubler 14 that in turn is connected to a phase shifter 15 coupled to the inputs 11 and 12 of the cathode ray tube 10. The resulting trace on the cathode ray tube 10 is a circular Lissajous pattern and by modulating the "z" axis or intensity grid of the cathode ray tube 10 only a portion of the circular trace 95 is allowed to produce a visible trace. The system used for driving the "z" axis or control grid of the oscilloscope includes a trigger output circuit 16 coupled to the control grid and having its input connected to a thyratron control circuit 17. The input circuit for the thyratron control 17 may be a transducer 18 having a D.C. signal output that is a function of some mechanical quantity such as torque or angular displacement. An amplifier 19 coupling the transducer 18 to the thyratron circuit 17 is provided to increase the voltage output of the transducer 18 to a level that is adequate to drive the thyratron control circuit 17. If the signal output of the transducer 18 is an A.C. voltage, then a rectifier and filter system is included in the output of the amplifier 19.

Figure 2:
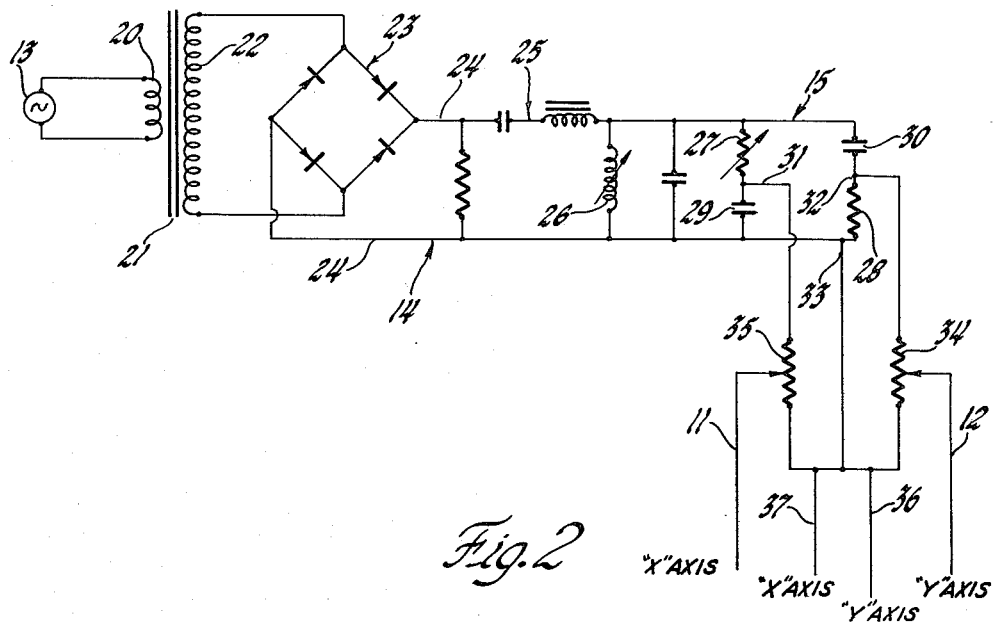
FIGURE 2 is a circuit diagram illustrating in detail the beam deflection portion of the system of FIGURE 1.

Circuit details of the frequency doubler 14 and the phase shifter 15 are illustrated in FIGURE 2. A primary winding 20 of transformer 21 is connected to the alternating supply source 13 and the voltage output of a secondary winding 22 is applied across opposite terminals of a full wave bridge rectifier circuit 23. The output of the full wave rectifier 23 is connected and applied through leads 24 to a filter circuit 25 to obtain a smooth, sinusoidal, alternating voltage for energizing the phase shifter 15. If the supply 13 is a standard 60 c.p.s. source, then the output of the filter circuit 25 will be a 120 c.p.s. alternating voltage, since two pulses are derived from the rectifier 23 for each complete input cycle. Connected to the output terminals of the filter 25 is a circuit comprising resistors 27 and 28 connected in a bridge arrangement with capacitors 29 and 30. The values of these components are selected so that the potential existing between a junction 31 and a common point 33 is displaced by a phase angle of 90° with respect to the potential existing between a junction 32 and the common point 33. The potential at the junction 31 is applied across a potentiometer 35 whose tapped output is connected by the conductor 11 to the "x" or horizontal input terminal of oscilloscope 10. In a like manner the potential at the junction 32 is applied to a potentiometer 34 and a tapped portion of the voltage across the potentiometer 34 is connected to the "y" or vertical axis of the scope by the conductor 10. The common point 33 is connected to the common terminals of the horizontal and vertical inputs of the oscilloscope 10 by a pair of conductors 36 and 37.

The variable potentiometers 34 and 35 provide an adjustment of the relative magnitudes of the horizontal and vertical input voltages to oscilloscope 10 so that a Lissajous pattern may be obtained that is a perfect circle.

Variable resistor 27 in the phase shift circuit 14 allows a fine adjustment of the phase angle between the horizontal and vertical driving potentials so that the relative phase angle can be maintained at exactly 90°. A variable inductor 26 in the filter circuit 25 of the frequency doubler 14 is provided to obtain a means for tuning the filter circuit 25 to exactly double the frequency of the alternating voltage supply source 13.

Figure 3:
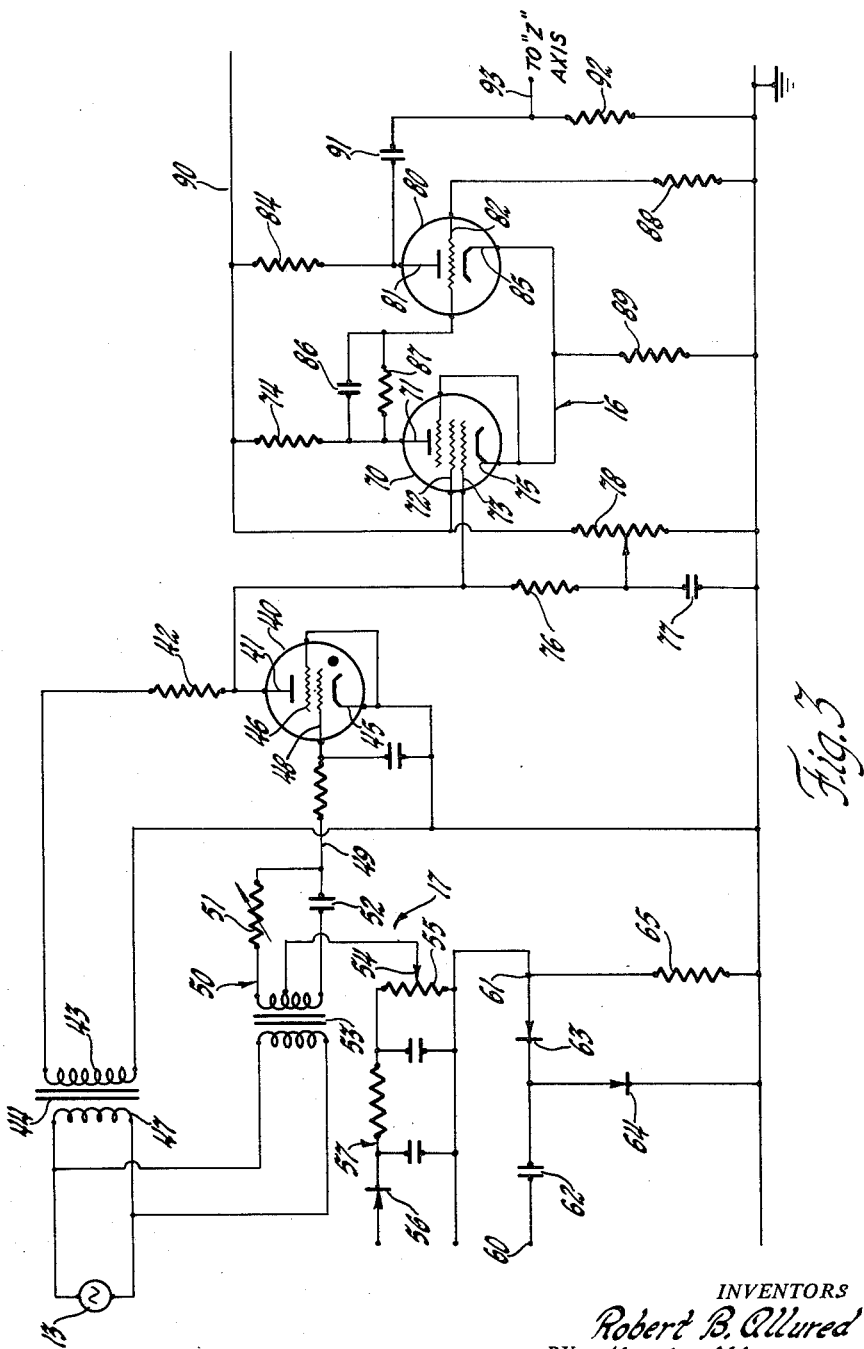
FIGURE 3 is a circuit diagram illustrating in detail the intensity modulation portion of the system of FIGURE 1.

A schematic diagram of the thyratron control circuit 17 and the trigger output circuit 16 is shown in FIGURE 3. A thyratron 40 has its plate electrode 41 connected through a plate load resistor 42 to one side of secondary winding 43 of a transformer 44. The cathode 45 is connected to ground and to the opposite side of secondary winding 43. Screen grid 46 of thyratron 40 is connected to the cathode 45. The transformer 44 includes a primary winding 47 that is energized from the alternating voltage supply source 13 so that the voltage supply to the plate 41 will be in phase with the voltage input to the frequency doubler 14. The thyratron 40 includes a control grid 48 and the voltage on this grid 48 is the sum of three voltages including an A.C. bias, a D.C. bias, and a D.C. signal input. To provide the A.C. bias, the grid 48 is connected through a conductor 49 to a phase shift circuit 50 which includes a variable resistor 51 and a capacitor 52. The phase shift circuit 50 is connected to the secondary winding of a transformer 53. The primary winding of transformer 53, like that of transformer 44, is connected to the alternating voltage supply source 13 so that the secondary voltage of the transformer 53, to which the resistor 51 and capacitor 52 are connected, is in phase with the plate voltage of the thyratron 40. The voltage existing between the center tap of the secondary winding and the conductor 49, however, is in a lagging phase relationship with respect to the voltage on the plate 41 due to the phase shift circuit 50. The amount of phase shift may be changed by adjusting the variable resistor 51.

To provide D.C. bias of positive polarity for grid 48, the grid is further connected through conductor 49 and phase shift circuit 50 to a variable 54 on a potentiometer 55. The potentiometer 55 is connected to a source of D.C. voltage that may be any suitable source, such as a battery, or alternatively may be connected by a rectifier 56 and a filter 57 through a suitable transformer to the alternating voltage supply 13.

The D.C. signal input to the circuit of the grid 48 is applied across a resistor 65 connected between resistor 55 and ground. This input is negative and subtracts from the positive D.C. bias supplied by the potentiometer 55. If the output of the transducer 18 (FIG. 1) is a D.C. voltage, it may be applied through suitable amplifiers to a terminal 61 and across the resistor 65. However, if the transducer 18 produces an A.C. output, then a rectifier and filter circuit including a capacitor 62 and rectifiers 63 and 64 are inserted to couple the transducer to the resistor 65. The A.C. input is then connected to a terminal 60, and the positive half cycles charge the capacitor 62 through the rectifier 64 while the negative half cycles add to the charge on the capacitor 62 in a voltage doubler action to supply a negative D.C. input signal to the grid 48.

The trigger output circuit for providing intensity modulation of the oscilloscope includes a pentode 70 and a triode 80. Grid 73 of tube 70 is directly connected to the plate 41 of the thyratron 40 and is further connected to ground through a resistor 76 and a capacitor 77. The lower end of resistor 76 is connected to a variable tap of a grid biasing potentiometer 78 that is connected from a plate supply line 90 to ground. Line 90 is directly connected to the screen grid 72 of the tube 70 and is connected through plate load resistors 74 and 84 to plates 71 and 81 of tubes 70 and 80. Plate 71 of tube 70 is connected through a parallel circuit including capacitor 86 and resistor 87 to the control grid 82 of tube 80.

Grid 82 is further connected to ground through resistor 88. A common cathode resistor 89 connects the cathodes 75 and 85 of tubes 70 and 80 to ground. A capacitor 91 and a resistor 92 connected in series between plate 81 and ground provide an output circuit for the tube 80 and this output circuit is connected through conductor 93 to the "z" axis or intensity grid of the oscilloscope of FIG. 1.

In the above described trigger circuit the voltage on the grid 73 of tube 70 will be zero when thyratron 40 is conducting, since the cathode 45 of the thyratron is connected to ground. When the thyratron 40 is cut off or non-conducting, the voltage on grid 73 is the sum of the plate voltage of thyratron 40 plus the voltage supplied to grid 73 from biasing resistor 78. Resistors 74, 87 and 88 constitute a voltage divider across tube 80 and the values of these resistors are so chosen that the bias on control grid 82 of tube 80 is such that the tube is normally conducting when tube 70 is non-conducting. Tube 70 is non-conducting when the voltage on grid 73 is zero or some negative value.

In the operation of the oscilloscope display system of the present invention, the trace 95 on the screen of the oscilloscope 10 normally would complete two circular sweeps during each cycle of the alternating supply 13 due to the frequency doubler 14 and the phase shifter 15 in the horizontal and vertical deflection circuits of the oscilloscope. The sweep is essentially blanked out, however, due to the value of the potential on the intensity grid or "z" axis, except when a relatively high positive voltage is coupled from the trigger output circuit at the plate 81 of triode 80. This can occur only when the triode 80 is cut off and this cut off condition exists only when a positive voltage of magnitude sufficient to drive the pentode 70 into conduction is coupled to the grid 73. Being directly coupled to the plate 41 of the thyratron 40, no positive potential can exist on the grid 73, except when the plate supply voltage for the thyratron 40 is in the positive half cycle and the thyratron is not conducting. Thus, a positive pulse input to the intensity grid of oscilloscope 10 exists only during the beginning of a positive half cycle of the alternating voltage supply 13. The width of this pulse input is inversely related to the portion of the positive half cycle that the thyratron 40 conducts. The thyratron 40 fires at some point determined by the magnitude of the negative D.C. signal input across the resistor 65 and after firing conducts for the remainder of the positive half cycle. When the output of the transducer 18 is zero, the thyratron 40 is fired shortly after the beginning of the positive half cycle of the alternating voltage supply 13. Thus, the pulse input to the intensity grid of the oscilloscope 10 is a narrow pulse and results in merely a spot at the beginning of one of the circular sweeps of the oscilloscope trace. When the output of the transducer 18 is at a maximum, the voltage across the resistor 65 is highly negative and the thyratron 40 does not fire until near the end of the positive half cycle of the thyratron plate supply. Thus, the pulse output taken from the plate 81 is wide, approximately equal in time to one-half cycle of the alternating voltage supply 13, and almost a complete circle of one of the circular sweeps will be intensified and visible on the oscilloscope. Although the oscilloscope beam sweeps through two complete circles in each cycle of the alternating voltage supply 13, the thyratron 40 can conduct no more than one-half of a supply cycle, so at the condition of maximum D.C. signal input the trace on the screen will be no more than one complete circle. It is thus seen that the transducer 18 of FIGURE 1 will produce a voltage proportional to a pressure, force, strain or other phenomena being measured, and a visual indication will appear on the oscilloscope 10 in the form of a circular trace 95 having an arc length proportional to the transducer output voltage.

What is claimed is:

1. Apparatus for modulating a circular trace on an oscilloscope such that the visible arcuate length of the trace will be proportional to the magnitude of a signal voltage including, in combination, an oscilloscope having beam deflecting elements and a beam intensity modulating element, means coupled to said deflecting elements and connected with an alternating voltage supply source for driving said deflecting elements such that a circular trace results on said oscilloscope, a pulse generating circuit having an input and output, and a driving circuit having an input connected to said alternating voltage supply source and also with a source of said signal voltage and having an output circuit adapted to develop an output voltage when the voltage of said supply source is approximately equal to said signal voltage, said pulse generating circuit having its input connected to the output of said driving circuit and having its output connected to said modulating element whereby a pulse is applied to said element, said pulse having its leading edge synchronized with a fixed point in each cycle of said alternating voltage supply and the pulse width of each pulse is a function of the magnitude of said signal voltage.

2. In a circuit for modulating the intensity of an electron beam in an oscilloscope having a circular sweep, a thyratron having a plate, a grid, and a cathode, phase shift bias means and variable D.C. bias means connected between said cathode and grid, a resistor connecting said plate to an alternating voltage supply source, means for synchronizing said circular sweep with said alternating voltage supply source, conductive means connecting said cathode to a point of reference potential such that said thyratron conducts only during a positive half cycle of said alternating voltage supply source and fires at some point in said positive half cycle dependent upon the phase relationship between said phase shift bias means and said alternating voltage supply source and further dependent upon the magnitude of said variable D.C. bias, pulse producing means connected to said plate and operative to generate an electrical pulse output having a leading edge occurring when the voltage of said alternating voltage supply source enters a positive half cycle and a trailing edge occurring when said thyratron fires, and conductive means for coupling said pulse output to an intensity modulating element of said oscilloscope.

3. In a circuit for modulating the intensity of an electron beam in an oscilloscope, a thyratron having a plate, a grid, and a cathode, phase shift bias means and variable D.C. bias means connected between said cathode and said grid, conductive means connecting said cathode to a reference potential, a resistor connecting the plate to an alternating voltage supply source such that the thyratron can conduct only during a half cycle of said alternating voltage when said alternating voltage is positive with respect to said reference potential and fires at some point in said half cycle dependent upon the phase relationship between said phase shift bias means and said alternating voltage supply source and further dependent upon the magnitude of said variable D.C. bias, a monostable multivibrator having an input and an output and adapted to remain in a stable state when the voltage applied to said input is negtaive with respect to said reference potential and to switch to an unstable state and remain therein as long as the input voltage is substantially positive with respect to said reference potential, conductive means connecting said plate with said input whereby a pulse will be produced at said output during each positive half cycle of said A.C. supply having a leading edge occurring when the voltage of the supply enters the positive half cycle and a trailing edge occurring when the thyratron fires.

4. Apparatus for producing a circular trace on an oscilloscope screen such that the arcuate length of said trace is proportional to the magnitude of a signal voltage including, in combination, an oscilloscope having horizontal and vertical deflection means and beam intensity modulation means, an alternating voltage supply source, a phase shift circuit connected to said source, coupling means connecting said phase shift circuit to said deflection means such that said trace on said oscilloscope screen will describe a circular pattern at a repetition rate that is related to the frequency of said alternating voltage supply, pulse generating means operatively connected to said beam intensity modulating means, said pulse generating means including a thyratron having an input circuit and an output circuit, a source of phase shift bias voltage and a source of variable D.C. bias voltage that is responsive to said signal voltage connected in said input circuit, means connecting said alternating voltage supply source in said output circuit such that the thyratron can conduct only during one-half of a cycle of said alternating voltage, said thyratron being adapted to fire at some point during said one-half cycle dependent upon the phase relationship between said phase shift bias voltage and said alternating voltage supply and also dependent upon the magnitude of said variable D.C. bias voltage, means connected with said output circuit for producing an output pulse having a leading edge occurring when said alternating voltage enters said one-half cycle and a trailing edge occurring when said thyratron fires, and conductive means connecting said last named means with said beam intensity modulating means.

5. Apparatus for producing a circular trace on an oscilloscope screen such that the arcuate length of said trace is proportional to the magnitude of a signal voltage including, in combination, an oscilloscope having horizontal and vertical deflection means and beam intensity modulation means, an alternating voltage supply source, a frequency doubler connected to said source, a phase shift circuit connected to said doubler, coupling means connecting said phase shift circuit to said deflection means such that said trace on said oscilloscope screen will describe a circular pattern at a repetition rate of double that of the frequency of said alternating voltage supply, pulse generating means operatively connected to said beam intensity modulating means, said pulse generating means including a thyratron having an input circuit and an output circuit, a source of phase shift bias voltage and a source of variable D.C. bias voltage that is responsive to said signal voltage connected in said input circuit, means connecting said alternating voltage supply source in said output circuit such that the thyratron can conduct only during one-half cycle of said alternating voltage, said thyratron being adapted to fire at some point during said one-half cycle dependent upon the phase relationship between said phase shift bias voltage and said alternating voltage supply and also dependent upon the magnitude of said variable D.C. bias voltage, a trigger circuit conductively connected with said output circuit and adapted to produce a relatively high voltage output during said one-half cycle prior to said point in said one-half cycle when the thyratron fires and a relatively low voltage output during the remainder of the entire cycle of said alternating voltage supply, and conductive means connecting said trigger circuit with said beam intensity modulating means.

6. Apparatus for producing a circular trace on an oscilloscope screen such tht the arcuate length of said trace is proportional to the magnitude of a signal voltage including, in combination, an oscilloscope having horizontal and vertical deflection means and beam intensity modulation means, an alternating voltage supply source, a frequency doubler connected to said source, a phase shift circuit connected to said doubler, coupling means connecting said phase shift circuit to said deflection means such that said trace on said oscilloscope screen will describe a circular pattern at a repetition rate of double that of the frequency of said alternating voltage supply, pulse generating means operatively connected to said beam intensity modulating means, said pulse generating means including a thyratron haivng a plate, a grid, and a cathode, a source of phase shift bias voltage and a source of variable D.C. bias voltage that is responsive to said signal voltage connected between said cathode and said grid, means connecting said cathode to a reference potential, a resistor connecting said plate to said alternating voltage supply source such that the thyratron can conduct only when said alternating voltage is positive with respect to said reference potential, said thyratron being adapted to fire at some point in the positive half cycle dependent upon the phase relationship between said phase shift bias voltage and said alternating voltage supply and also dependent upon the magnitude of said variable D.C. bias voltage, a mono-stable multivibrator having an input and an output, conductive means connecting said plate with said input, said multivibrator being adapted to remain in a stable state while the voltage on said plate is negative with respect to the reference potential and while the voltage is equal to said reference potential and adapted to switch to an unstable state when the voltage on said plate is substantially greater than said reference potential, and conductive means connecting said output with said beam intensity modulating means.

7. In apparatus for providing a circular trace on an oscilloscope wherein the visible arcuate length of the trace is related to the magnitude of a signal voltage, a deflection circuit for said oscilloscope including an alternating voltage source for providing said circular trace, a pulse generating circuit having an input and an output and being adapted to provide an output voltage at said output when the voltage at said inpu is greaer than a given level, conductive means connecting said output to a beam intensity modulating element of said oscilloscope whereby the beam of said oscilloscope will be rendered visible when said output voltage is present, and a driving circuit synchronized with said alternating voltage source and connected to a source of said signal voltage, said driving circuit being connected to the input of said pulse generating circuit and adapted to provide an input voltage thereto which exceeds said given level at the beginning of each cycle of said alternating voltage for a period of time related to the magnitude of said signal voltage.

References Cited in the file of this patent
UNITED STATES PATENTS

| | | |
|---|---|---|
| 2,178,074 | Jakel | Oct. 31, 1939 |
| 2,403,278 | Hershberger | July 2, 1946 |
| 2,444,036 | Crost | June 29, 1948 |
| 2,457,580 | Mayer | Dec. 28, 1948 |
| 2,881,356 | Van Alstyne | Apr. 7, 1959 |